(No Model.)

E. W. DAVIS.
ROLLER BEARING.

No. 603,586.  Patented May 3, 1898.

Witnesses
W. F. Vaughan
Victor J. Evans

Inventor
Edwin W. Davis.
by John Wedderburn
Attorney

United States Patent Office.

ELWIN W. DAVIS, OF GENEVA, MINNESOTA.

ROLLER-BEARING.

SPECIFICATION forming part of Letters Patent No. 603,586, dated May 3, 1898.

Application filed June 9, 1897. Serial No. 640,034. (No model.)

*To all whom it may concern:*

Be it known that I, ELWIN W. DAVIS, of Geneva, in the county of Freeborn and State of Minnesota, have invented certain new and useful Improvements in Roller-Bearings; and I do hereby declare the following to be a full, clear, and exact description of the invention, such as will enable others skilled in the art to which it appertains to make and use the same.

My invention relates to sectional or built-up vehicle-hubs which are made up of a number of separate parts bolted together and provided with roller-bearings for the axle-spindle, so as to reduce the friction therebetween.

The invention consists in the novel construction and combination of parts hereinafter fully described and claimed.

Figure 1:
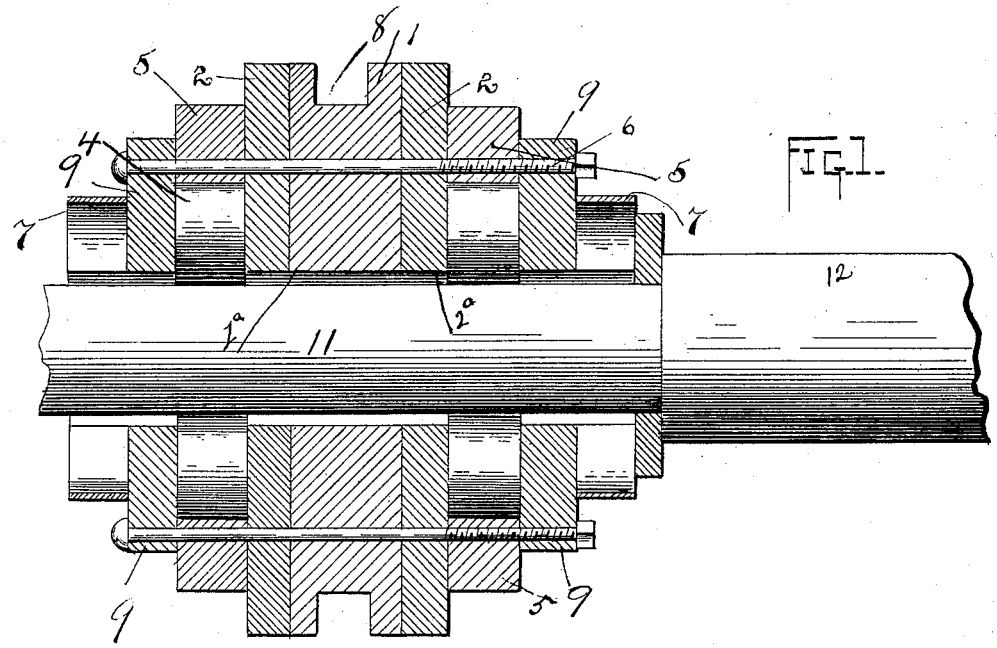
Figures 2, 3:
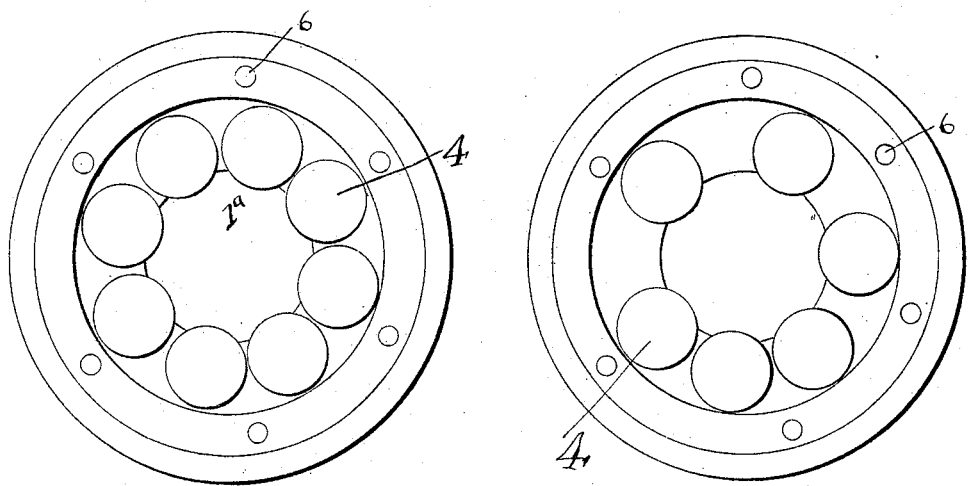

In the accompanying drawings, Figure 1 is a longitudinal sectional view of a sectional hub constructed according to my invention, showing the same applied to the spindle of a vehicle-axle. Fig. 2 is an end view with the end plates or disks removed. Fig. 3 is a similar view, some of the rollers being removed.

In the said drawings the reference-numeral 1 designates the central portion of the hub, consisting of a circular plate or disk formed with a central opening $1^a$ for the passage of a spindle and with peripheral recesses 8 to receive the inner ends of the spokes. (Not shown.) Bolted to the plate or disk, as hereinafter described, at opposite sides thereof, are disks 2, also formed with corresponding central openings $2^a$, and secured to said disks 2 and abutting against the same are rings 5, and secured thereto are end disks 9.

The numeral 6 designates screw-bolts passing through said disks and rings for holding or securing them to each other. It will be seen that an enlarged space is formed between the disks 2 and 9, in which are located cylindrical rollers 4. These rollers rest loosely in said space and are of such diameter as to project beyond the inner edges of the openings in the said disks.

The numerals 7 designate sand-bands.

The numeral 11 designates the spindle of an axle 12, the diameter of which is smaller than that of the openings in said disks and rings, so as not to come in contact therewith, but is equal to the space between the rollers, so that when the hub is placed on the spindle the roller will bear against the latter. These rollers in practice not only revolve upon the spindle, but will also rotate on their axes, thus reducing the friction to a minimum.

Having thus fully described my invention, what I claim is—

In a sectional hub, the combination, with the central portion formed with a central opening and with peripheral recesses, the disks secured thereto formed with corresponding openings, the rings secured to said disks having enlarged central openings, the end disks formed with openings corresponding with those of the other disks and the screw-bolts for securing said disks and rings to each other, of the cylindrical rollers loosely inserted in said rings and projecting beyond the openings in said disks, and the axle-spindle of a diameter less than the openings in said disks and against which said rollers abut, substantially as described.

In testimony whereof I have signed this specification in the presence of two subscribing witnesses.

ELWIN W. DAVIS.

Witnesses:
    MARY B. PICKERING,
    LOUIE M. PICKERING.